United States Patent [19]
Duft et al.

[11] 3,956,055
[45] May 11, 1976

[54] COMPOSITE PANEL AND SHAPE FORMING APPARATUS

[75] Inventors: Buddy L. Duft, Palm Springs; Steven I. Feher, Solana Beach; Liberate Patag, San Diego, all of Calif.

[73] Assignee: Material Systems Corporation, Escondido, Calif.

[22] Filed: Sept. 17, 1973

[21] Appl. No.: 397,780

[52] U.S. Cl. ............................. 156/438; 156/200; 156/276; 156/279; 156/286; 156/509
[51] Int. Cl.² ..................... B32B 31/06; B44C 1/20
[58] Field of Search ........... 156/150, 151, 196, 200, 156/231, 242, 246, 247, 267, 276, 279, 286, 312, 350, 356, 438, 461, 488, 500, 501, 508, 509, 519, 523, 524, 529, 547, 555; 19/151

[56] References Cited
UNITED STATES PATENTS

| | | | |
|---|---|---|---|
| 2,927,623 | 3/1960 | Huisman et al. | 156/276 |
| 3,006,402 | 10/1961 | Ferla | 156/242 |
| 3,061,496 | 10/1962 | Meyer | 156/276 |
| 3,067,469 | 12/1962 | Yarrison | 156/242 |
| 3,071,180 | 1/1963 | Finger et al. | 156/519 |
| 3,109,763 | 11/1963 | Finger | 156/276 |
| 3,400,035 | 9/1968 | Haig | 156/247 |
| 3,528,592 | 9/1970 | White | 19/155 |
| 3,536,551 | 10/1970 | Simon | 156/276 |
| 3,560,294 | 2/1971 | Potkanowicz | 156/276 |
| 3,616,030 | 10/1971 | Jumentier et al. | 156/276 |
| 3,639,202 | 2/1972 | Simon | 156/276 |
| 3,652,353 | 3/1972 | Belisle | 156/62.4 |

*Primary Examiner*—William A. Powell
*Assistant Examiner*—John E. Kittle
*Attorney, Agent, or Firm*—Lane, Aitken, Dunner & Ziems

[57] ABSTRACT

Apparatus for continuously forming flat sheets or shapes from a composite of resin, reinforcing fibers and a particularized filler including a series of successive material deposition and treating stations through which the composite is pulled while sandwiched between upper and lower flexible and essentially continuous carrier sheets. The apparatus particularly suited for such composites where a high percentage of filler is used and is applicable to the formation of diverse flat sheet or shaped cross-sectional configurations.

10 Claims, 22 Drawing Figures

COMPOSITE PANEL AND SHAPE FORMING APPARATUS

BACKGROUND OF THE INVENTION

This invention relates to composite panel or shape forming apparatus and more particularly, it concerns an improved apparatus for continuously forming flat sheets or shapes from a composite of reinforcing fibers and particulate filler in a matrix of thermosetting resinous material by the applying of the materials of the composite between a pair of continuous sheet-like carriers and pulling the sheets and material through a linear series of successive compacting, treating shaping and curing stations in a manner such that the flat sheet or shape being so continuously formed may be finished and severed into panels ready for use.

Various forms of apparatus are known in the prior art by which the individual components of a fiber reinforced board or sheet to be formed are distributed either simultaneously or successively onto a continuously moving surface, such as an endless conveyor or elongated carrier sheet, and then passed through successive treatment stations by which a continuous form of the board or sheet being manufacturing emerges for cut-off and stock piling. See, for example, U.S. Pat. Nos. 3,071,180 and 3,109,763 issued to Joseph S. Finger et al. While prior forms of such apparatus are admirably suited to high speed production of structural panels and the like, specific apparatus heretofore available have been generally deficient from the standpoint of adaptability to different constituent materials to be employed in the composite board, diverse cross-sectional shapes in the board, sheet or panel being formed as well as capability for providing a truly uniform distribution of composite material components throughout the resulting panel or board product. For example, relatively high percentages of inexpensive particularized inorganic fillers have been found desirable in structural panels both from the standpoint of reduced costs and enhanced nonflammability. Such materials, however, have been difficult to handle in prior apparatus because of the extent to which they increase viscosity of their mixture in resins. Also, composite boards are conventionally formed in a corrugated cross-section for use in various structural applications where longitudinal rigidity as a result of the corrugated cross-sectional configuration is needed. Quite often, however, it is either necessary or desirable to change the specific cross-sectional configuration. In prior apparatus, however, this could be accomplished only by the substitution of costly dies and molds and involves a time consuming and tedious procedure.

From the standpoint of component intermixing and uniformity of distribution, such prior apparatus has been found to lack facility for varying percentages of components incorporated in a continuously formed board and also have demonstrated deficiencies in achieving a uniform distribution of the components throughout the product. In this latter respect, fibrous components employed principally as reinforcement in a matrix resin pose problems of distribution as a result of interfiber adherence due either to electrostatic traction or surface tension and further are subject to non-uniform distribution as a result of non-uniform directional forces imposed on the fibers as they are distributed onto the matrix.

In light of these exemplary deficiencies, a need for improvements in both methods and apparatus for forming such composites board is apparent.

SUMMARY OF THE PRESENT INVENTION

In accordance with the present invention, an improved apparatus for continuously forming composite material flat sheets or shapes is provided in which an elongated sheet of flexible carrier material is continuously payed out from the supply roll and drawn past successive lower matrix, reinforcing fiber and particularized earth dispensing units each synchronized with the linear speed of carrier travel in accordance with predetermined composite flat sheet or shape design criterion so as to achieve a precisely determined percentage of each composite material component uniformly across the width of the carrier. After receiving an upper layer of essentially liquid matrix material an upper sheet carrier or covering, substantially identical to the lower sheet carrier, is brought into overlying coextensive with the lower sheet carrier and the composite materials deposited thereon. The composite material thus sandwiched between the two carriers is then advanced through an unique compactor unit in which air entrapped between the carrier sheets is removed and also the material is worked or kneaded. Thereafter, the material is passed through curing ovens each equipped with an inexpensive lower sheet metal die to which the composite is conformed by an unique arrangement of wiper blades. The easily interchangeable forming arrangement in the curing ovens is followed by a puller also having a facility for adaptability to different cross-sectional configurations of board being formed. Following the puller, the carrier sheets are recovered on means adapted to be substituted for the initial carrier supply rolls thereby enabling reuse of the carrier sheets. The essentially rigid and formed board of any shape passing the carrier recovery station is then appropriately finished, trimmed and cut into discrete lengths to provide panels ready for use.

Among the objects of the present invention are, therefore, the provision of an improved apparatus for the continuous formation of composite material flat sheets or shapes; the provision of such an apparatus having a novel and unique material distribution system by which the quantity of materials incorporated in the board may be accurately controlled; the provision of such a material distribution system by which uniformity of material throughout the board is assured; the provision of an unique system in such apparatus for removing air as well as volatiles that may develop during polymerization of a resin matrix; the provision of an inexpensive and versatile forming mold organization for such an apparatus; and the provision of pulling and finishing units for such an apparatus by which diverse cross-sectional configurations of the formed panel may be readily accommodated.

Other objects and further scope of applicability of the present invention will become apparent from the detailed description to follow taken in conjunction with the accompanying drawings in which like parts are designated by like reference numerals.

DETAILED DESCRIPTION OF THE PREFERRED EMBODIMENT

Figure 1:
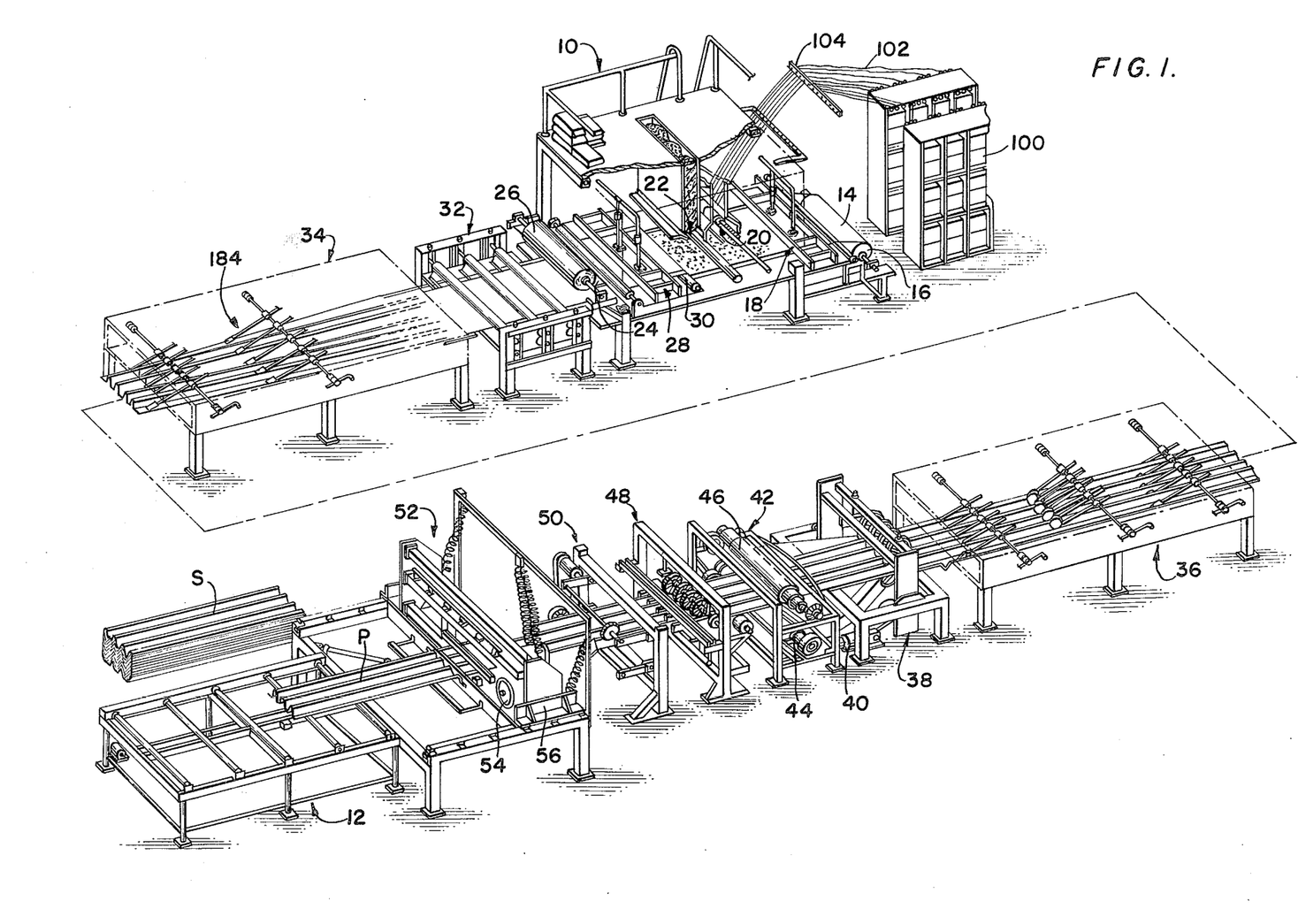
FIG. 1 is a divided perspective view illustrating the overall apparatus of the invention.

In FIG. 1 of the drawings, the overall apparatus of the invention is shown to include a linear series of components beginning with a material dispensing tower 10 and ending with a part receiving conveyor table 12 from which finished panels P manufactured by the apparatus are removed and assembled in stacks S for shipment. The panels P, which may be corrugated as shown flat or any other shape, are preferably a substantially rigid laminate or composite of fiber reinforcement and particularized earth filler in a thermosetting resin matrix. The manner in which the panels are formed by the apparatus of this invention can be appreciated from the general illustration of successive components illustrated in FIG. 1. Hence, at the material dispensing tower 10, a lower carrier 14 of mylar or similar sheet material is payed out from a lower carrier supply roll 16 and passed under a lower matrix dispenser 18 to receive a uniform coating of uncured resin or resin-filler mixture in a manner to be described in more detail below. The coated lower carrier 14 then proceeds under a fiber dispenser 20 and a filler dispenser 22. Following the filler dispenser 22, an upper carrier 24 of the same material as the lower carrier 14 and stored in an upper carrier supply roll 26 is passed forwardly under an upper matrix dispenser 28 to be uniformally coated also with a layer of uncured resin after which it is passed downwardly over a guide roller 30 so that the coating thereon overlies the filler material and fibers previously deposited on the lower matrix. At a point under the guide roller 30, therefore, the composite of the upper and lower matrix coatings deposited on the upper and lower carriers 24 and 14, respectively, together with the filler and fiber reinforcement is sandwiched between the upper and lower carriers.

Upon leaving the material dispensing tower 10, the carrier supported composite is first passed through a material compactor 32 to complete an intermixing of the composite ingredients and remove air which may be trapped between the carriers. Following the compactor 32, the material passes through a preliminary polymerization oven 34, a final polymerization oven 36 to a puller 38 having a drive motor 40 of sufficient power to draw the carriers 14 and 24 from the supply rolls 16 and 36 through the several components aforementioned. Following the puller 38, the fully cured and formed composite passes a carrier recovery component 42 at which the carrier sheets 14 and 24 are separated from the formed composite and recovered on take-up rolls 44 and 46, respectively.

After the carriers are removed, the cured composite passes a surface finishing component 48, an edge trimmer 50 and a cut-off component 52 in the form of a transversely moving saw 54 supported on a carriage 56 mounted for longitudinal movement with the composite being formed to sever the final panel P. The panels P are thus continuously formed until the ends of the carrier supply rolls 16 and 26 are reached, at which point, new carrier supply rolls are placed into position and the process reinitiated. Also in this context, it is to be noted that the carrier sheets are reusable and that the recovery rolls 44 and 46 are designed to be interchanged with the supply rolls 16 and 26 in a manner to be described more fully below.

Figure 2:
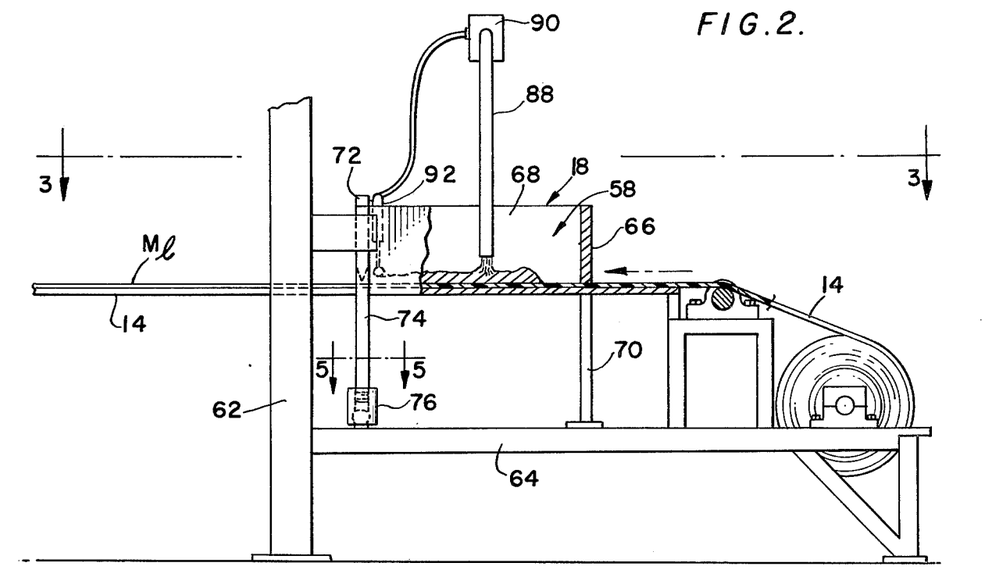
FIG. 2 is an enlarged fragmentary cross-section illustrating the general organization of a lower matrix dispenser forming a component of the apparatus illustrated in FIG. 1.
Figure 3:
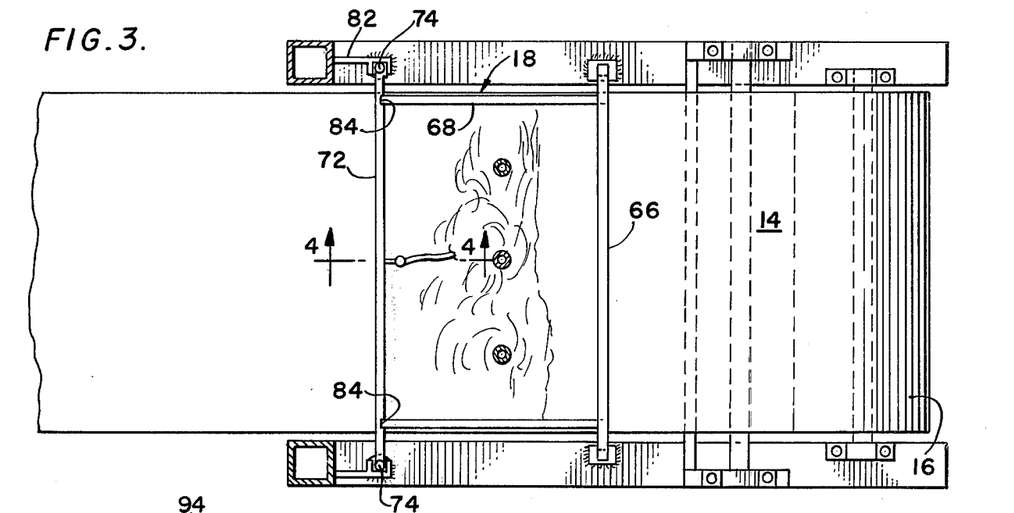
FIG. 3 is a fragmentary plan view as seen on line 3—3 of FIG. 2.
Figure 4:
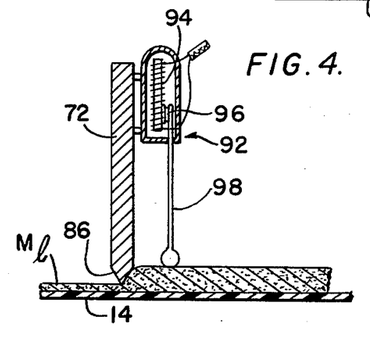
FIG. 4 is an enlarged fragmentary cross-section taken on line 4—4 of FIG. 3.
Figure 5:
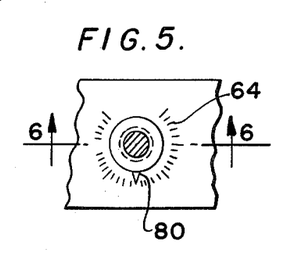
FIG. 5 is an enlarged fragmentary cross-section taken on line 5—5 of FIG. 2.
Figure 6:
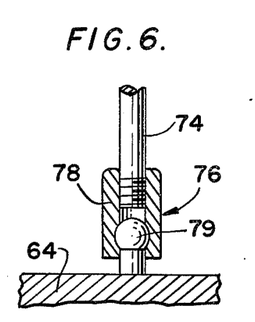
FIG. 6 is a fragmentary cross-section taken on line 6—6 of FIG. 5.

Structural organization and detail of the lower matrix dispenser 18 is illustrated most clearly in FIGS. 2–6 of the drawings. As shown in FIGS. 2 and 3, the dispenser 18 includes a puddling box 58 supported in vertically spaced relation over the lower carrier 14 which, at this point in its overall travel, is supported in horizontal planar relation by a table 60 carried by frame members 62 and 64 forming part of the material dispensing tower 10. The puddling box 58 is formed by a leading transverse wall 66 from which a pair of side walls 68 extend as integral projections in the direction of lower carrier travel. The side wall 68 as well as the leading wall 66 are of the same height and are positioned above the upper surface of the table 60 by vertical standards 70 welded or otherwise suitably affixed to the horizontal frame member 64 to provide a running clearance with the lower carrier 14. The trailing end of the puddling box 58 is closed by an adjustable gauge blade 72 supported at opposite ends by vertical standards 74 in turn supported by the frame members 64 through calibrated adjustable couplings 76. Details of the couplings are shown in FIGS. 5 and 6 to include a rotatable coupling sleeve 78 internally threaded at its upper end to engage external threads at the lower end each standard 74 and an internal enlargement near its lower end to receive a ball stud 79 mounted on the frame member 64 thereby to enable rotation of the sleeve without axial displacement with respect to the frame member 64. Also as shown in FIG. 5, the sleeve 78 is provided with an indicating projection 80 cooperable with calibrations 82 on the upper surface of the frame member 64. The gauge blade 72, thus supported for vertical adjustability on the standards 74, is further supported against lateral displacement by slide brackets 82 welded or otherwise suitably secured to the vertical frame members 62 and through which the vertical standards extend as shown in FIGS. 2 and 3. Suitable means such as mortises in the gauge blade 72 are provided to effect a sliding liquid seal with the trailing ends of the side members 68.

As shown in FIGS. 2 and 4, the lower side of the gauge blade 72 is provided with a linear horizontal strike 86 which functions to gauge the thickness of the lower matrix layer $M_1$ applied to the lower carrier 14. The means by which the matrix material is supplied essentially viscous liquid form to the puddling box is shown in these figures to include a plurality of discharge pipes 88 operated under the control of an automatic valve 90. The valve 90, in turn, is controlled electrically by a float gauge 92 shown in FIG. 4 to include a variable resistor 94 supported directly by the gauge blade 72 and engaged by a point contact 96 supported at the upper end of a float rod 98. As a result of this organization, the level of matrix material in the puddling box or on the upstream side of the gauge blade 72 may be maintained at a predetermined level above the strike 86. The specific thickness of the matrix layer $M_1$ applied to the lower carrier 14 is a function of carrier velocity, height of the strike 86 above the upper surface of the carrier and height of the matrix puddle within the box 56 above the strike 86 as sensed by the float gauge 92. In light of the organization of components illustrated in FIGS. 2–6, it will be appreciated that each of these functions may be accomodated to enable accurate control over the thickness of matrix applied to the lower carrier 14. It is to be noted that in some instances, the matrix material will be a highly viscous mixture of uncured resin and filler. In such instances the correlation of matrix level and strike blade setting to carrier travel become essential to the achievement of the layer $M_1$ on the carrier.

Figure 7:
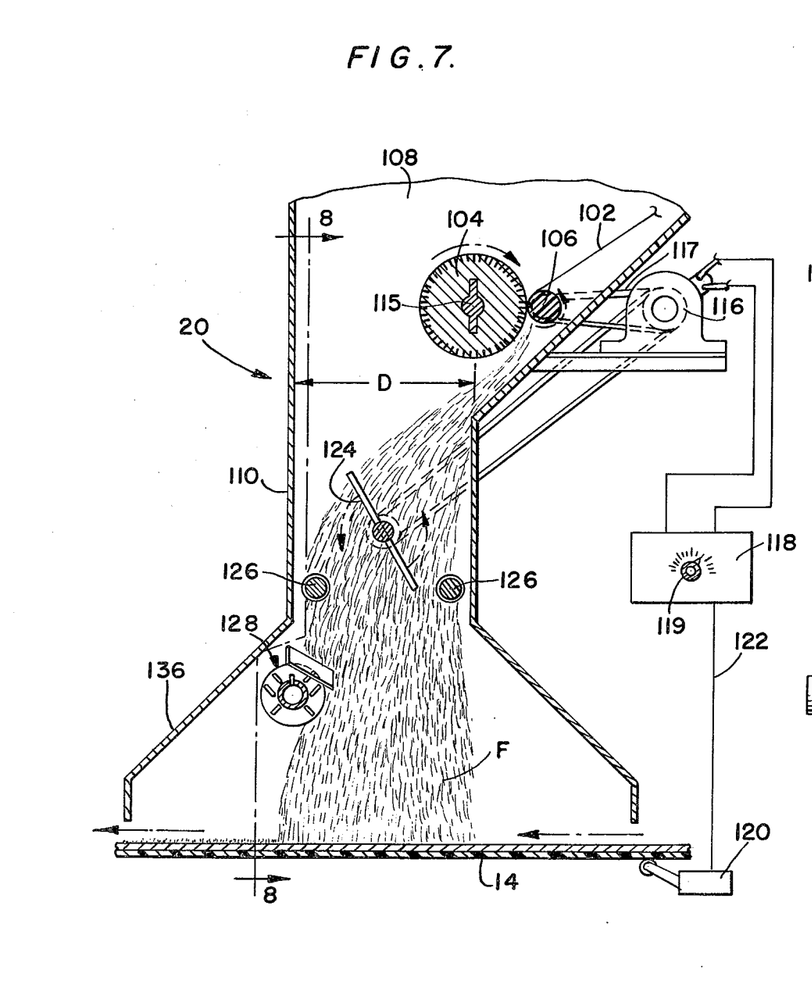
FIG. 7 is an enlarged fragmentary cross-section illustrating a reinforcing fiber cutting and distributing assembly forming part of the apparatus of the invention.
Figure 8:
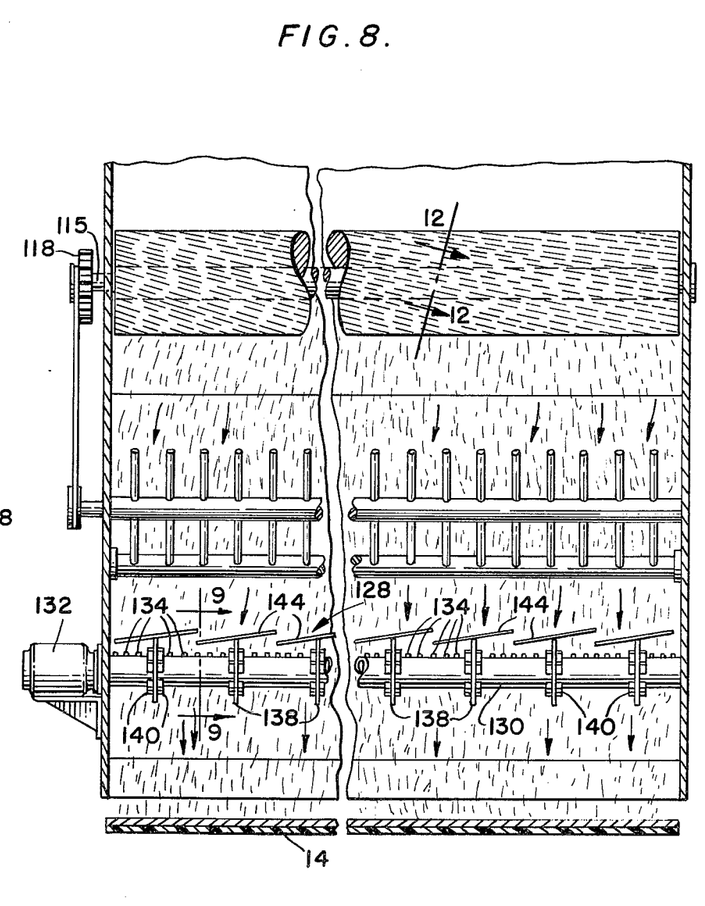
FIG. 8 is a fragmentary cross-section on line 8—8 of FIG. 7.
Figure 12:
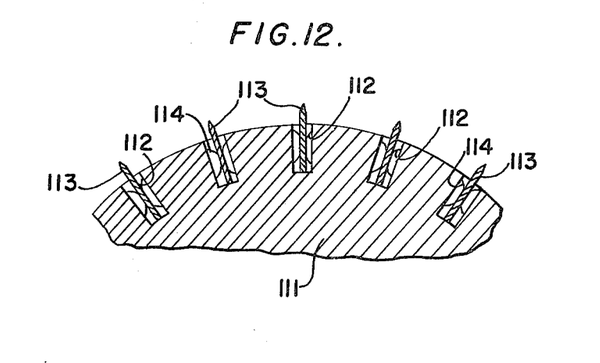
FIG. 12 is an enlarged fragmentary cross-section taken on line 12—12 of FIG. 8.

As pointed out above with respect to the general organization illustrated in FIG. 1 of the drawing, following the application of the lower matrix $M_1$ to the lower carrier 14 in the manner aforementioned, the carrier supported matrix is advanced past the fiber dispenser 20. Although the constructional details of the fiber dispenser 20 are shown most clearly in FIGS. 7–12 of the drawings, reference is first made against to FIG. 1 in which the supply of fibers is illustrated in somewhat schematic form to include a bank of storage reels 100 from which a large number of individual rovings or strands 102 are fed past a tension control brake 104 directly to the fiber dispenser 20. As shown in FIGS. 7 and 8, the continuous strands 102 are severed into short lengths to form fibers F by passage between a rotatable cutting knife 104 and a pliable friction roller 106 extending transversely across the mouth 108 of an aerodynamically designed fiber dispensing chute 110. The structural details of the cutting knife 104 can be appreciated by reference to FIGS. 7, 8 and 12 of the drawings. Specifically, the cutter knife is shown to include a relatively solid cylindrical body 111 having a plurality of radial grooves 112 extending in generally helical fashion along the length of the body, each groove 112 receiving a plurality of discrete cutting knives resembling conventional razor blades and retained in the grooves by spring clips 114. The body 111 is keyed on a shaft 115 adapted to be driven by an electric motor 116 through appropriate mechanical transmission means including a pulley driven belt 117 and a coupling gear 118 so that the cutting knife 104 and the roller 106 are driven in opposite directions as depicted by the arrows in FIG. 7 of the drawings. Because of the manner in which the individual blades 113 are mounted in the cutter knife body 111, replacement either of individual cutting blades 113 or pull of the blades is readily accommodated.

The motor 116 is regulated by a control unit 118 having a manual control knob 119 as well as a provision for regulating the speed of the motor 116 and thus the cutting knife 104 automatically in accordance with the linear velocity of the carrier 14. This automatic control function is effected by a velocity sensing unit 120 electrically connected to the control unit 118 through a line depicted at 122 in FIG. 7. In light of this control organization, it will be appreciated that the quantity of fibrous material drawn from the storage reel bank 100 and severed into short lengths by the cutting knife 104 may be controlled very accurately in accordance with the linear velocity at which the carrier 14 is passed under the overall fiber dispenser.

An important aspect of the fiber dispenser is the provision of means to insure that the individual fibers F passing the cutter knife 104 are caused to fall as discrete units unimpaired by any directional force onto the lower matrix $M_1$ on the carrier 14. This function is carried out by the combined effects of the shape and dimensions of the fiber discharge chute 110 and the successive actions on the downwardly falling fibers F brought about by a fiber sorter and tumbler 124, electromagnetic field generating coils 126 and a specially designed air distributor 128 all as shown generally in FIGS. 7 and 8 of the drawings. Specifically, the sorter-tumbler, with which the downwardly falling fibers F first come in contact, is rotated in a direction opposite from that of the cutter knife 104 to neutralize the downwardly oriented dynamic force of the falling fibers. After passing the sorter-tumbler, the fibers are subjected to an electromagnetic field generated by the pair of spaced coils 126 supplied with electric circuit by appropriate circuitry including current regulating and reversal means (not shown) so that the static charge existing on the cut fibers may be fully neutralized, thereby to avoid any adherence of the fibers to each other as a result of such static electricity. Finally, the downwardly falling fibers are acted upon by the air distributor 128 which, because of its specific structural design to be described in more detail below, develops a generally swirling air cushion capable of both parting any fibers adhered to each other by surface tension and effecting a cancellation of any directional force experienced by the discrete fibers. Hence, after passing the level of the air distributor 128, the discrete fibers F are caused to fall gently onto the lower carrier supported matrix in an extremely uniform manner.

Figure 9:
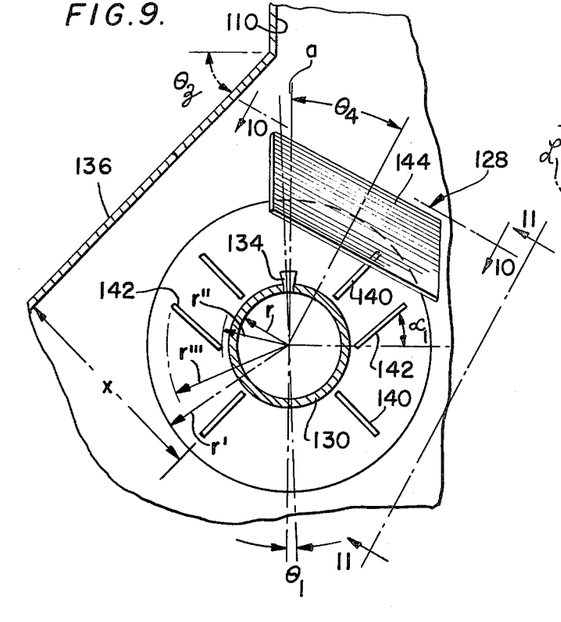
FIG. 9 is an enlarged fragmentary cross-section taken on line 9—9 of FIG. 8.
Figure 10:
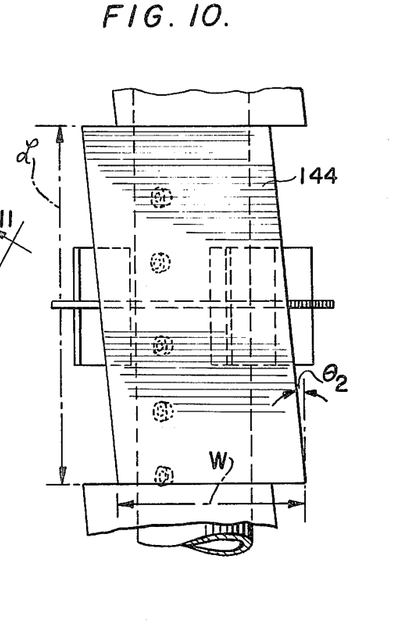
FIG. 10 is a fragmentary plan view as seen from line 10—10 of FIG. 9.
Figure 11:
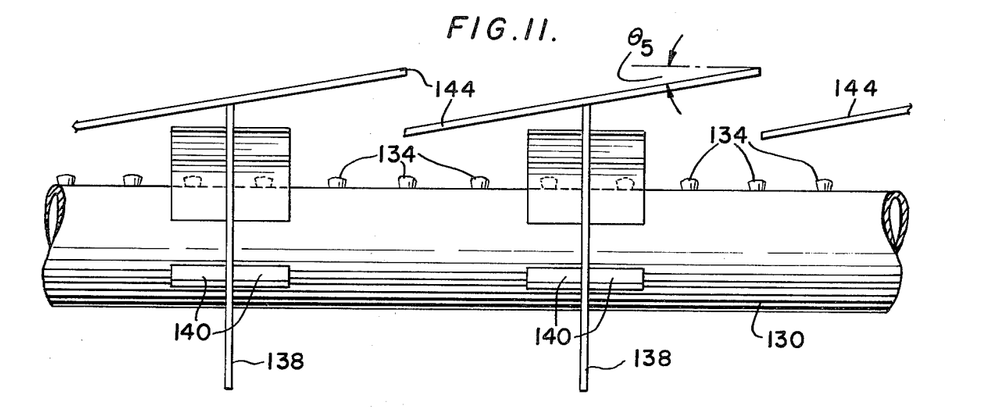
FIG. 11 is a fragmentary elevation as seen on line 11—11 of FIG. 9.

The structural organization of the air distributor 128 is most clearly understood by reference to FIGS. 8–11 of the drawings. As shown in FIGS. 8 and 9, the air distributor is formed by an elongated manifold 130 supplied at one end by a variable capacity air blower 132 or piped air supply, closed at its opposite end and having a plurality of equally spaced nozzles 134 uniformly spaced in a radial plane $a$ extending throughout the length of the manifold 130. The location of the manifold axis in relation to the vertical duct section and an outwardly flared hood section 136 of the fiber chute 110 is best shown in FIG. 9. Specifically, the axis of the manifold is located in the vertical plane of the vertical duct wall on the downstream side of the distributor and spaced from the inclined hood wall 136 by a distance $x$. Also it is seen in this figure that the discharge axis of the nozzles 134 as defined by the radial plane $a$ is displaced from the vertical by an angle $\theta_1$. Located between each five nozzles 134 along the length of the manifold 130 are circular fins 138 projecting radially from the outside of the manifold. Each of the circular fins 138 supports a plurality of mixer fins 140 and 142 as well as a relatively large angularly disposed aerodynamic fin 144. The shape of the individual mixer fins is established by a simple rectangular plate whereas the shape of the aerodynamic fins is in the nature of the a parallelogram having a length L, a width W, the longer sides being displaced by an angle $\theta_2$ from a line perpendicular to the end edges.

Although the specific dimensions and angular relations of the components forming the air distributor 128 may be varied without departure from the spirit and scope of the present invention, the following ranges of specifc dimensions and angular relations of these components are believed optimum where the depth D of the vertical duct section of the fiber distributing chute 110 is equal to approximately 12 inches, where the hood portion at an angle $\theta_3$ in the range of 35° to 55° and where the distance $x$ is equal to approximately 4 inches: the radius $r$ of the manifold 130 is 1 inch; five equally spaced nozzles 134 defining ⅛ to ¼ inch diameter orifices (depending on available input pressure) are positioned in a 6 inch length between the circular fins 138; the radius $r'$ of the circular fins is 2.4 times the radius of the manifold or in this case 2.4 inches; the radii $r''$ and $r'''$ establishing the inner and outer positions of the mixer fins 140 and 142 are 1⅛ inches and 2⅛ inches respectively but are in proportion to 2:4 to 1 above; the length of the mixer fins is equal to the diameter of the manifold or in this case 2 inches; four of the mixer fins 140 on each of the circular fins 138 are oriented at approximately 45° ± 5° with respect to the nozzle discharge plane $a$ whereas the other two of the mixer fins 142 are disposed at an angle $\alpha$ with respect to a plane normal to the nozzle discharge plane, the angle $\alpha$ ranging from 30° to 50°. The aerodynamic plates 144 illustrated are sized so that the length L is approximately six times the manifold radius or in this case 6 inches whereas the width W is approximately L/2 or 3 inches and the angle $\theta_2$ equal to approximately 5° ± ½°. The plates 144 are welded or other wise fixed in tangential relation to the outer circumference to the circular fins 138 normal to an angle $\theta_4$ with respect to the nozzle discharge plane $a$, $\theta_4$ being in the range of 27° to 29°. Also, the plates 144 are disposed at an angle $\theta_5$ with respect to the longitudinal axis of the manifold, the angle $\theta_5$ in the specific example being 10° ± 1°. With the components of the air distributor 128 thus disposed in relation to each other and to the discharge chute 110 an extremely uniform distribution of fibers resulted on the matrix $M_1$ supported on the lower carrier.

Figures 13, 14:
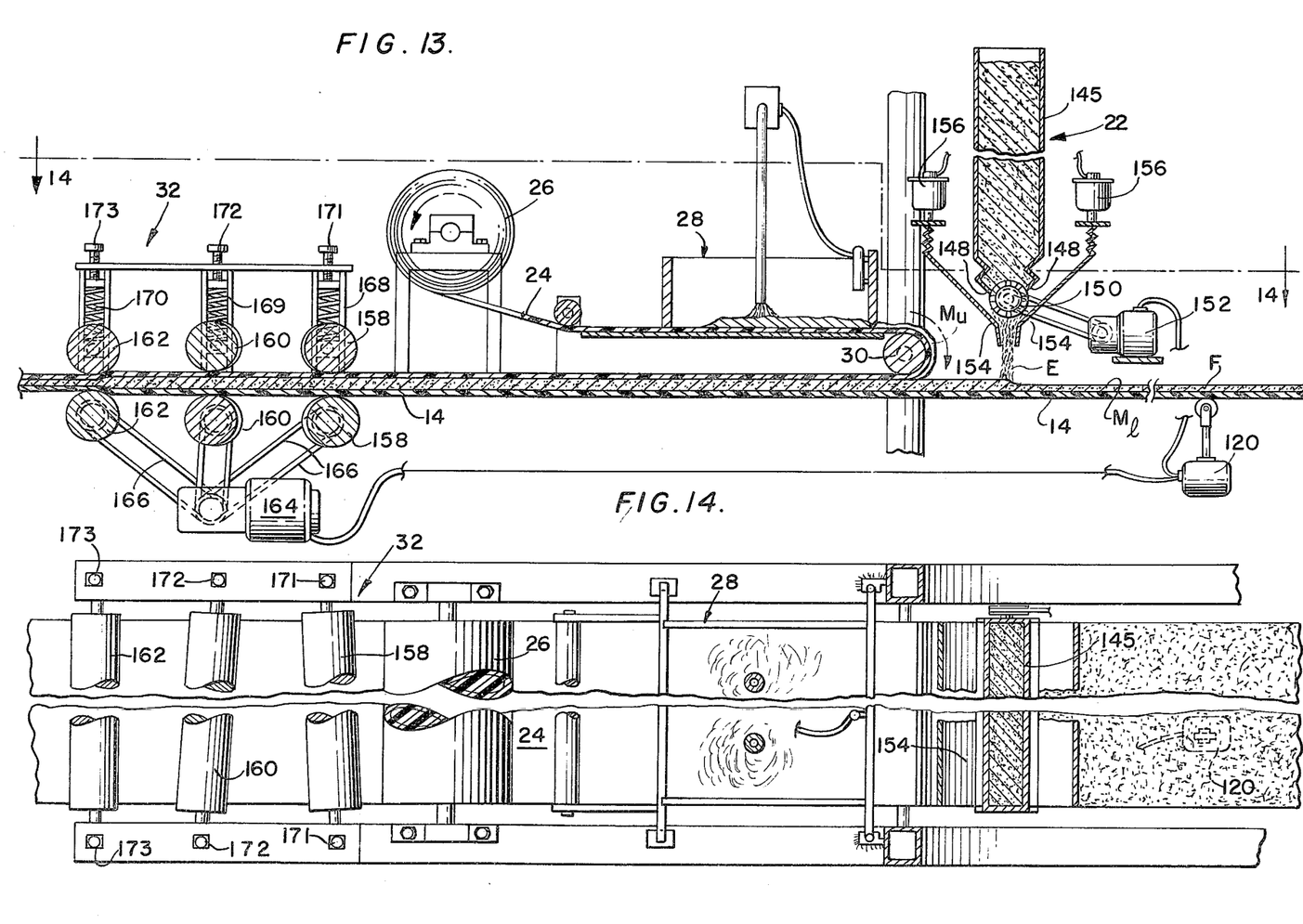
FIG. 13 is a fragmentary cross-section illustrating the filler dispenser, upper matrix dispenser and material compactor components of the apparatus.
FIG. 14 is a plan view in partial section taken on line 14—14 of FIG. 13.

Following the application of the fibers F to the lower matrix $M_1$ the lower carrier 14 passes under the filler dispenser at which a particularized earth filler E is added to the composite of the lower matrix and fibers. As shown in FIGS. 1, 13 and 14, the filler dispenser 22 includes a hopper 145 opening at its upper end at a level substantially the same as a floor 146 in the dispensing tower 10. The filler dispenser functions to disperse uniformly over the top of the lower matrix $M_1$ and fibers F a precise quantity of filler material per unit length of lower carrier travel. To this end, the lower end of the hopper 145 is provided with an opening defined by a pair of transverse lips 148 which bear against a rotatable perforated drum or cylinder 150 driven by a variable speed motor 152, the output speed of which is controlled by the carrier velocity sensing unit 120. Upon rotation of the perforated cylinder 150 in accordance with linear velocity of the carrier 14, the particularized earth filler is passed from the hopper into the cylinder 150 from which it is discharged under the influence of centrifugal force. The amount of material thus discharged from the dispensing perforate cylinder 150 is therefore, directly proportional to the speed at which the cylinder is rotated by the motor 152. After passing from the perforate drum, the filler is thrown by centrifugal force against a pair of inclined shields 154 coupled to vibrator units 156. Vibration of the shields 154 by the vibrating units 156 eliminates any adherence of the filler to the shields by surface tension or moisture. The discharge of filler E from the funnel-like gap between the shields 154 impinges the filler against the fibers F and lower matrix $M_1$ in a manner such that the matrix $M_1$ is forced into the essential shear areas between the fibers F and also, the impinging force of the filler E forces any non-wetted fibers into the lower matrix $M_1$.

After the filler E is distributed over the composite of the fibers F and the lower matrix $M_1$, an upper matrix layer $M_u$ having been deposited on the upper surface of the upper carrier 24 is inverted about the idler roller 30 and brought into contact with the composite of the filler, fibers and lower matrix. The upper matrix dispenser 28, as shown in FIGS. 13 and 14, is identical in all respects to the lower matrix dispenser 18 previously described. Accordingly, further description of the upper matrix dispenser 28 is deemed unnecessary.

After passing the idler roller 30, the composite materials, at this time sandwiched between the upper and lower carriers 24 and 14, respectively, passes the material compactor 32 to remove any entrapped air, to densify the composite and to further distribute the matrix material throughout the composite. As also shown in FIGS. 13 and 14 of the drawings, the material compactor 13 takes the form of three successive roller pairs 158, 160 and 162. The upper and lower rollers in each of the aforementioned roller pairs are coupled to each other by gearing (not shown) and to a variable speed motor 164 through appropriate power transmission means such as endless belts 166. The motor 164 is operated also under control of the carrier speed sensing unit 120 so that the tangential velocity of the roller pairs will be slightly slower than the linear speed of the carriers and the composite between the carriers. As a result, each of the roller pairs effect a blading action against the carriers and composite material. At least the upper roller in each of the roller pairs 158, 160 and 162 is biased to develop a compressive pressure against the respective lower roller by suitable means such as helical compression springs 168, 169 and 170 rendered adjustable by set screws 171, 172 and 173, respectively. Although the pressures set in the springs may vary depending on composite thickness and formulation, the pressure exerted by the roller pair 158 is slightly greater than by the roller pair 160 and less than the pressure exerted by the final roller pair 162. Because of this pressure variation between the three roller pairs, a kneadidng action is imposed on the composite. Also, the pressure exerted by the first roller pair 158 will serve as the barrier for air trapped between the carriers 14 and 24 and cause such entrapped air to back to the roller 30. The lessening of pressure by the roller pair 160, on the other hand, permits some realignment of the composite components while at the same time, because of the blading action brought about as a result of the speed at which these rollers are driven, will serve to remove further air. Also it will be noted by reference to FIG. 14 that both roller pairs 158 and 160 are aligned angularly with respect to the transverse dimension of composite being formed so that air passing these roller pairs will be moved outwardly also to the edges of the carriers 14 and 24. The highest pressure being exerted by the final roller pair 162 serves as a final barrier or screen for any entrapped air so that the material after passing the roller pair 162 is fully intermixed and devoid of any entrapped air.

The assembly of the composite material and the carriers 14 and 24 thus passing from the material compactor 32 are drawn through successive preliminary and final polymerization ovens 34 and 36, respectively. Although these ovens appear linearly spaced in light of the broken perspective view of FIG. 1, in practice it is contemplated that they will be very closely spaced or abutting one another as illustrated in FIGS. 15-18 of the drawings. The ovens 34 and 36, in and of themselves, are conventional to the extent that they are comprised of four sided enclosures and having a source of heat (not shown) by which the composite entering the preliminary polymerization oven 34 in essentially liquid form leaves the final polymerization oven 36 in polymerized or in a solid and rigid form. The preliminary polymerization oven 34, therefore, functions primarily to supply adequate heat energy to the composite so as to remove substantially all of the volatiles generated by the polymerization process and to advance the polymerization process so that the composite is converted from the essentially liquid condition to a maleable solid condition. An important feature of the present invention is the provision of means within both of the ovens 34 and 36 by which the material is drawn into the desired ultimate cross-sectional configuration and also by which the removal of volatiles from the composite is facilitated.

Figure 15:
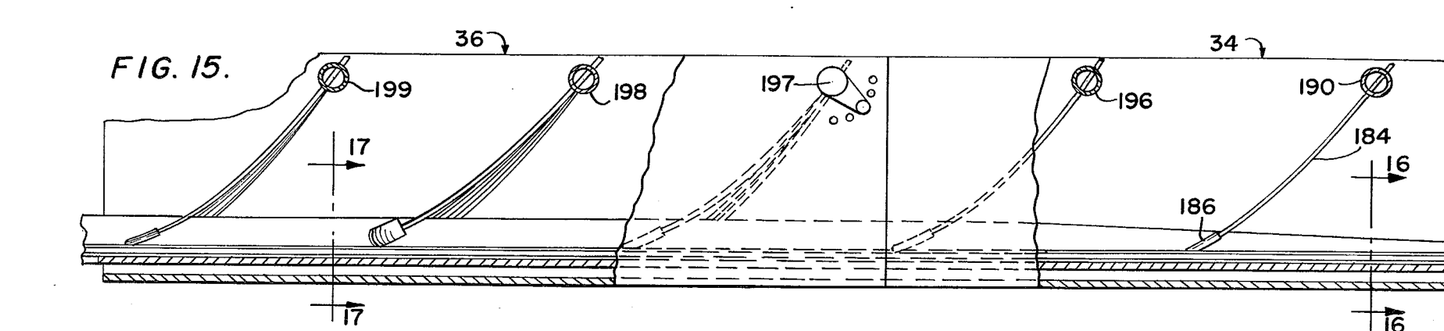
FIG. 15 is an enlarged side elevation in partial cross-section illustrating curing ovens forming a portion of the apparatus of this invention.
Figures 16, 17, 18:
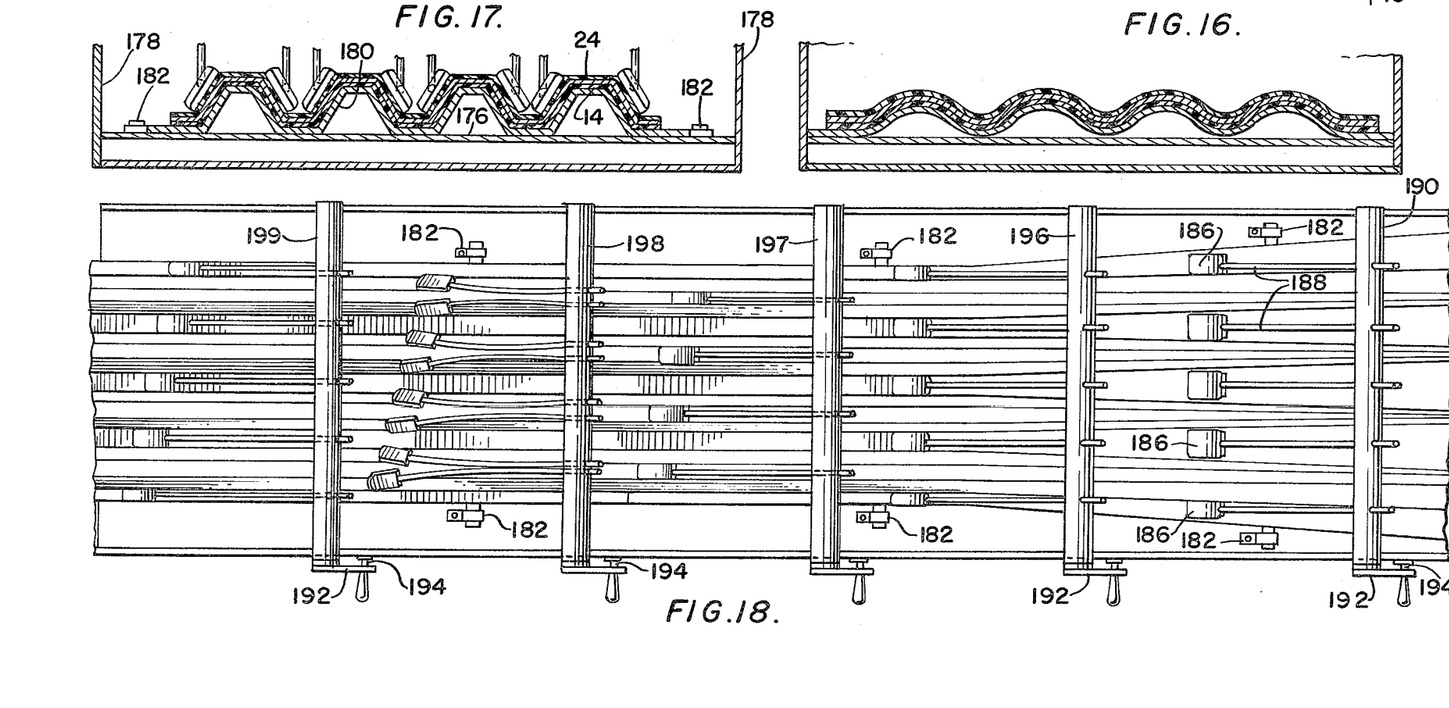
FIG. 16 is an enlarged fragmentary cross-section taken on line 6—6 of FIG. 15.
FIG. 17 is a similarly enlarged cross-section taken on line 17—17 of FIG. 15.
FIG. 18 is a plan view illustrating the wiper blade organization illustrated in FIG. 15.

With reference to FIGS. 1 and 15-18 of the drawings, both ovens 34 and 36 are shown to include a generally planar floor 176 spanning the distance between a pair of vertical side walls 178. An essentially continuous sheet metal mold 180 is supported by the floor 176 and shaped as desired to conform with the continuous cross-sectional configuration desired in the panels P, in this instance a corrugated configuration as shown in FIG. 17. The forming mold is formed in inexpensive sheet metal and is adapted to be clipped removably by suitable means such as spring clips 182 to the floor 176 of the ovens. Hence, it will be seen that different configurations of molds may be usedd or the molds may be removed entirely in the event a flat or planar shaped composite material panel is desired.

Positioned downstream from the entrance end of the preliminary polymerization oven 34, in terms of the carrier and material travel, is the first set 184 of a succession of forming wipers. The first set of wipers 184 is positioned in the ovens 34 such that the length of time for the composite material to pass from the entrance of the oven 34 to the first set of wipers 184 is sufficient to impart enough thermal energy to initiate polymerization. As shown in FIGS. 15 and 16, the wiper set 184 includes structurally a plurality of flexible blade-like wipers 186 supported at the lower end of spring rods 188 which in turn are fixed at their upper ends to a torque tube 190. The torque tube is supported for rotation in the side walls and rendered adjustable by a crank 192 having a pin latching mechanism 194 by which it can be retained in an angle to impose a preselected stress on the rods 188 and the wiper pads 186. Subsequent wiper pad sets are supported in identical fashion on other torque tubes 196–199 essentially as shown in FIGS. 15 and 18 of the drawings. It will be noted that the wiper pads on the respective torque tubes can be positioned to be staggered so that the entire surface of the carrier supported composite will be contacted by one or the other of the several wiper pads at some time during its travel throughout the polymerization of ovens 34 and 36. For example, the wiper pads supported from the torque tubes 190 and 196 are arranged to advance the composite into the valleys of the corrugated forming mold 180 whereas the wipers supported on the torque tubes 197 and 198 engage the top and sloping surfaces of the corrugated cross-section respectively.

In addition to functioning as means for conforming the partially polymerized composite to the configuration of the forming mold 180, the wipers serve to prevent the passage of any volatile vapor pockets in the composite which may result from the polymerization process. Specifically, the respective torque tubes are adjusted so that the wipers impose enough pressure on the carrier supported composite to achieve this function. Moreover, the wipers may be angularly placed in order that any vapor pockets which exist would pass to the open sides of the composite. Also, the organization of wipers and removable forming molds enables an infinite variety of cross-sectional shape possibilities and the cost of tooling or tooling changes is minimized. Further, it is contemplated that both shaped and flat panels may be formed by the invention simply by inserting the molds 180 and adjusting the compression wipers when a corrugated cross-section is required and removing the mold 180 and lifting the wipers where a relatively flat panel component is to be formed. In this latter instance, the volatile pocket removing function of the wipers might be served, for example, by substituting the individual wiper pads 186 with a continuous bar-like wiper supported uniformly by the several spring bars 188 from the respective torque bars.

Figure 19:
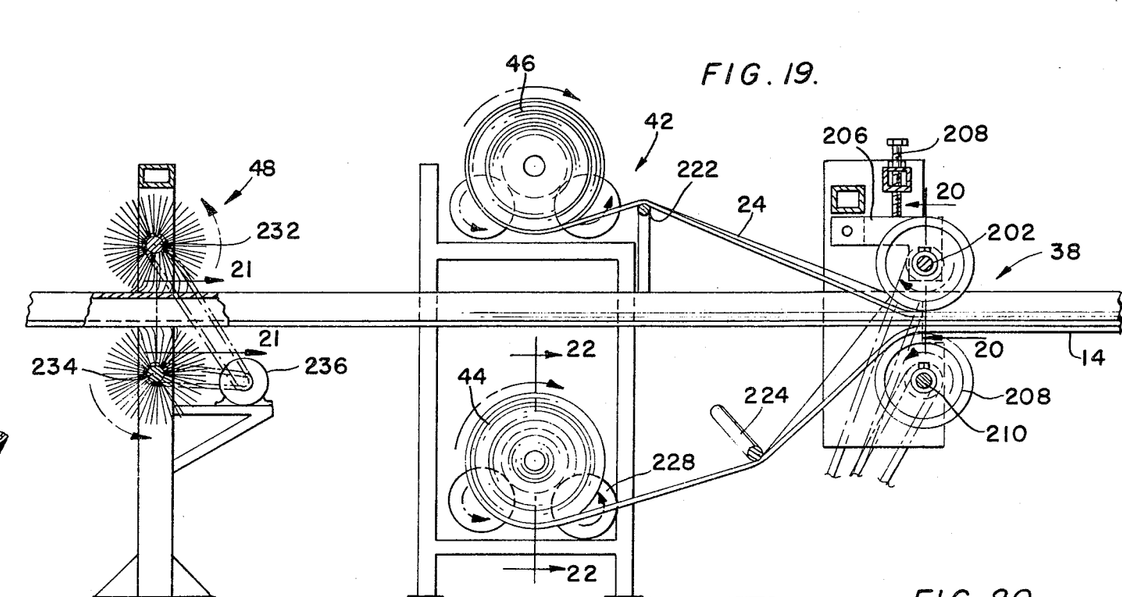
FIG. 19 is an enlarged cross-section illustrating respectively the material pulling assembly, the carrier recovery components as well as the surface preparation elements of the apparatus.
Figure 20:
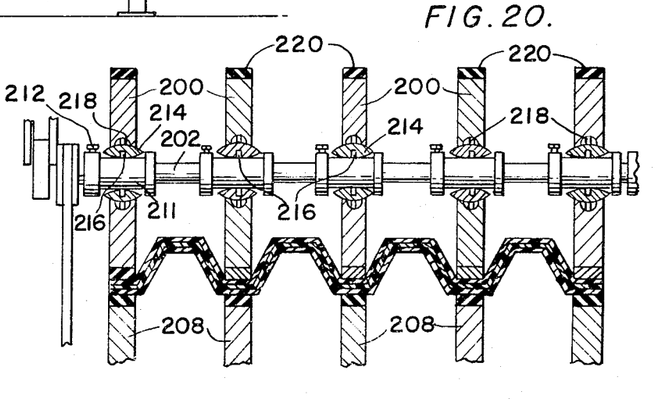
FIG. 20 is an enlarged fragmentary cross-section taken on line 20—20 of FIG. 19.

Upon leaving the outlet of the final polymerization of oven 36, the fully cured, essentially rigid and formed composite board retained between the upper and lower carrier sheets 24 and 14, respectively, passes between and is tractionally engaged by cooperating sets of pulling wheels forming the primary components of the puller 38 described above with respect to FIG. 1, but shown in more detail in FIGS. 19 and 20 of the drawings. In the specific embodiment illustrated, an upper set of five traction wheels 200 adjustably fixed on a drive shaft 202 driven by the motor 40 by way of drive pulley 204. As shown most clearly in FIG. 19, the drive shaft 202 is journaled at opposite ends in pivotal arms 206 underlying adjustable screws 208 so that the pressure of the upper set of rollers 200 may be increased or decreased in a downward direction against the upper carrier 24. Vertically aligned with the upper set of rollers 200 is an essentially identical set of lower rollers 208 keyed to a drive shaft 210 also driven by the motor 40 but journaled in fixed bearings so as to receive the downward compressive loading of the upper rollers 200.

Each of the traction rollers 200 is of identical construction and includes a sleeve hub 211 adjustably fixed against axial and rotational displacement with respect to the drive shaft 202 or 210 by a set screw 212. Each sleeve carries an annular bearing member 214 keyed by pins 216 for rotation with the sleeve. The external surface of each bearing member 214 is spherically convex to enable a limited degree of angular movement of the wheels 200 or 208 about an axis normal to the axis of the drive shafts 202 and 210. A second pin 218 extends between the insert 214 and the wheel to ensure a rotary driving connection between the shaft 202 and the wheel. The pin 218 engages in an arcuate key slot to allow a rocking action about the aforementioned axis normal to the shaft axis. Also each of the rollers 200 and 210 is provided with an outer traction tire 220 to insure a firm pulling grip on the assembly of upper and lower carriers as well as the cured composite panel. Because of the permitted axial adjustment of the sleeves 211 on the shafts 202 and 210 and also the angular freedom of the wheels with respect to the sleeves 211, the puller 38 can accommodate many diverse cross-sectional shapes of composite boards formed.

Figure 22:
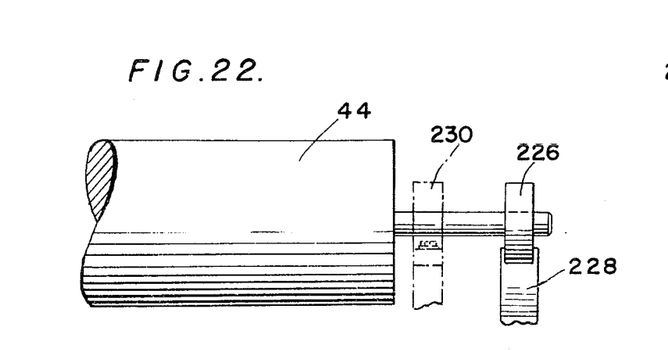
FIG. 22 is an enlarged fragmentary cross-section taken on line 22—22 of FIG. 19.

Following the puller 38, and also as above mentioned, the carriers 14 and 24 are separated from the composite panel shape and recovered by the take-up rolls 44 and 46. As shown more clearly in FIGS. 19 and 22 than in FIG. 1, the upper carrier 24 is trained at a diverging angle with respect to formed composite travel about an arcuate guide rod 222 functioning to maintain a centering relation between the carrier and the take-up roll 46. Similarly, the lower carrier 14 is directed downwardly about a centering arcuate guide rod 224 and then onto the lower take-up roll 44. To enable a sufficient driving rotation of the take-up rolls 44 and 46 by power drive means (not shown) without change in tangential velocity at which the carriers are taken up on the rolls 44 and 46 constantly varying radii, the take-up rollers are each provided with a spindle 224 having a traction roll spaced from the end of the carrier sheets as shown in FIG. 22. The rollers 226 are cradled between drive rollers 228 as shown in FIGS. 19 and 22 so that they may be driven by a constant speed motor. In this way, any reduction in angular velocity of the spindle 225 due to the increasing diameters of the take-up rolls may be accomodated by slippage between the rollers 226 and the drive rollers 228.

Also and perhaps more significantly, this arrangement enables the take-up rolls 44 and 46 merely to be removed from the cradling drive rollers 228 and substituted for the supply rolls 14 and 26 of reuse of the carriers. This position of the bearings of the supply rolls as shown in phantom lines in FIG. 22 and designated by the reference numeral 230.

Figure 21:
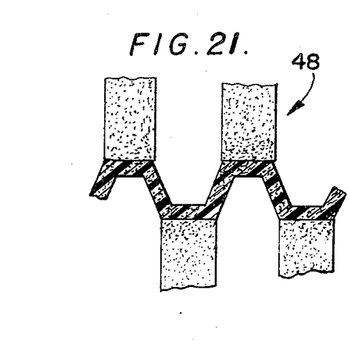
FIG. 21 is an enlarged fragmentary cross-section on line 21—21 of FIG. 19.

The details of the surface finishing component 48 are shown more clearly also in FIGS. 19 and 21 to include a plurality of vertically adjustable paddle sanding wheels 232 and 234 driven by a motor 236. As shown in FIG. 21, the respective upper and lower paddle sanding wheels are displaced so that the outwardly facing crests of the corrugated cross-section only may be smoothly finished principally to facilitate the corrugated shape to be sandwiched between a pair of flat skin panels by bonding, thereby to provide a structurally sound building panel.

As mentioned above with respect to FIG. 1, the trimming and cut-off saws 50 and 52, respectively, operate to trim and cut off the successive panels from the continually formed composite board. The details of these components is believed clear from the description given above with respect to FIG. 1.

Thus it will be seen that by this invention there is provided an highly effective method and apparatus for the production of composite material panels. Also it will be appreciated that minor variations can be made in the apparatus as disclosed without departure from the true spirit and scope of the present invention. Accordingly, it is expressly intended that the foregoing decription is illustrative of a preferred embodiment only, not limiting, and that the true spirit and scope of the present invention will be determined by reference to the appended claims.

We claim:

1. In an apparatus for manufacturing rigid structural flat sheet or shaped panels from a composite of reinforced resinous matrix material, the combination comprising: a material dispensing tower; support means for positioning supply rolls of lower and upper sheet material carriers respectively at the front and rear of said dispensing tower; a lower matrix dispenser including means to deposit a uniform coating of uncured resinous matrix material of predetermined thickness onto said lower carrier; means to distribute separated discrete reinforcing fibers uniformly over said matrix on said lower carrier and comprising cutter means for drawing a plurality of continuous filaments from a supply and cutting said linear filaments into discrete fibers of preestablished lengths, means to regulate the quantity of said discrete fibers cut by said cutting means in accordance with the linear velocity of said carriers [The apparatus recited in Claim 4 wherein said fiber distributing means further comprises] a generally vertical chute for guiding said fibers from said cutter onto said lower matrix coating and means for neutralizing directional forces imposed on said cut fibers by said cutter, whereby said fibers are both uniformly distributed across the width of said matrix coating and deposited thereon with the same exclusively gravitation force; means on said tower downstream from said fiber distributing means in relation to carrier travel for impinging particularized filler against said fibers and matrix uniformly across the width of said matrix coating; an upper matrix dispenser including means to deposit a uniform uncured resinous coating of predetermined thickness to said upper carrier; means for bringing the coating on said upper carrier into overlying coextensive relation with said lower carrier sheet and the material thereon; means defining successive treatment and curing stations for converting said composite of matrix material and reinforcing fibers from a relatively pliable condition to a substantially rigid condition, said last mentioned means including a compactor station having means for kneading said composite between said upper and lower carriers thereby to mix the uncured resin, fiber and filler constituents thereof and to remove entrapped gas therefrom prior to curing; means for pulling said carriers from said supply rolls through said successive stations and carrier removal and storage roll take-up means following said pulling means by which said upper and lower carriers are removed from the cured rigid composite and stored for replacement of said supply rolls.

2. The apparatus recited in claim 1 wherein said force direction neutralizing means comprises a rotatable sorter-tumbler positioned in said chute parallel to and below said cutter, means for rotating said sorter-tumbler in a direction opposite from the direction of said cutter roll, and air distribution means positioned in said chute below said sorter-tumbler for establishing an aerodynamic cushion below which said fibers fall solely by gravity onto said lower matrix.

3. The apparatus recited in claim 2 wherein said air distributor comprises an elongated manifold extending across the width of said chute parallel to and below said rotatable sorter-tumbler, said manifold having a plurality of upwardly directed nozzles inclined towards the center of said chute, a plurality of circular fins radiating from said distributor and a plurality of aerodynamic plate-like fins fixed tangentially to said fins, inclined relative to said manifold and overlying said nozzles whereby an air stream passing from said nozzles is caused to assume a gently swirling upwardly directed path.

4. In an apparatus for manufacturing rigid structural flat sheet or shaped panels from a composite of reinforced resinous matrix material, the combination comprising: a material dispensing tower; support means for positioning supply rolls of lower and upper sheet material carriers respectively at the front and rear of said dispensing tower; a lower matrix dispenser including means to deposit a uniform coating of uncured resinous matrix material of predetermined thickness onto said lower carrier; means to distribute separated discrete reinforcing fibers uniformly over said matrix on said lower carrier; means on said tower downstream from said fiber distributing means in relation to carrier travel for impinging particularized filler against said fibers and matrix uniformly across the width of said matrix coating; an upper matrix dispenser including means to deposit a uniform uncured resinous coating of predetermined thickness to said upper carrier; means for bringing the coating on said upper carrier into overlying coextensive relation with said lower carrier sheet and the material thereon; means defining successive treatment and curing stations for converting said composite of matrix material and reinforcing fibers from a relatively pliable condition to a substantially rigid condition, said last mentioned means including a compactor station having means for kneading said composite between said upper and lower carriers thereby to mix the uncured resin, fiber and filler constituents thereof and to remove entrapped gas therefrom prior to curing; means for pulling said carriers from said supply rolls through said successive stations and carrier removal and storage roll take-up means following said pulling means by which said upper and lower carriers are removed from the cured rigid composite and stored for replacement of said supply rolls, said means for kneading said composite comprising successive roller pairs, means associated with each of said roller pairs for exerting a uniform pressure by each roller pair across the width of said carriers, and means for driving said roller pairs rotatably at a tangential velocity less than the linear speed of travel of said composite thereby to cause said roller pairs to exert a blading effect on the composite.

5. The apparatus recited in claim 4 wherein said kneading means comprises first, second and third successive roller pairs, the pressure exerted by said first roller pair being greater than the pressure exerted by said second roller pair and less than the pressure exerted by said third roller pair.

6. The apparatus recited in claim 4 wherein said first and second roller pairs are inclined oppositely with respect to each other and with respect to the transverse dimension of said carriers thereby to cause gas entrapped between the carriers to be moved toward the side edges thereof.

7. In an apparatus for manufacturing rigid structural flat sheet or shaped panels from a composite of reinforced resinous matrix material, the combination comprising: a material dispensing tower; support means for positioning supply rolls of lower and upper sheet material carriers respectively at the front and rear of said dispensing tower; a lower matrix dispenser including means to deposit a uniform coating of uncured resinous matrix material of predetermined thickness onto said lower carrier; means to distribute separated discrete reinforcing fibers uniformly over said matrix on said lower carrier; means on said tower downstream from said fiber distributing means in relation to carrier travel for impinging particularized filler against said fibers and matrix uniformly across the width of said matrix coating; an upper matrix dispenser including means to deposit a uniform uncured resinous coating of predetermined thickness to said upper carrier; means for bringing the coating on said upper carrier into overlying coextensive relation with said lower carrier sheet and the material thereon; means defining successive treatment and curing stations for converting said composite of matrix material and reinforcing fibers from a relatively pliable condition to a substantially rigid condition, said last mentioned means including a compactor station having means for kneading said composite between said upper and lower carriers thereby to mix the uncured resin, fiber and filler constituents thereof and to remove entrapped gas therefrom prior to curing; means for pulling said carriers from said supply rolls through said successive stations and carrier removal and storage roll take-up means following said pulling means by which said upper and lower carriers are removed from the cured rigid comopsite and stored for replacement of said rolls, said means for pulling said carriers comprising a plurality of traction roller pairs each pair defining a nip through which said carrier and composite material is pulled, and means mounting each of said traction wheels for pivotal movement about their respective axes of rotation and for adjusting the position of said traction roller pairs along the axes of rotations whereby diverse cross-sectional configurations of formed composite may be engaged by said pulling means.

8. In an apparatus for manufacturing rigid structural flat sheet or shaped panels from a composite of reinforced resinous matrix material, the combination comprising: a material dispensing tower; support means for positioning supply rolls of lower and upper sheet material carriers respectively at the front and rear of said dispensing tower; a lower matrix dispenser including means to deposit a uniform coating of uncured resinous matrix material of predetermined thickness onto said lower carrier; means to distribute separated discrete reinforcing fibers uniformly over said matrix on said lower carrier; means on said tower downstream from said fiber distributing means in relation to carrier travel for impinging particularized filler against said fibers and matrix uniformly across the width of said matrix coating; an upper matrix dispenser including means to deposit a uniform uncured resinous coating of predetermined thickness to said upper carrier; means for bringing the coating on said upper carrier into overlying coextensive relation with said lower carrier sheet and the material thereon; means defining successive treatment and curing stations for converting said composite of matrix material and reinforcing fibers from a relatively pliable condition to a substantially rigid condition, said last mentioned means including a compactor station having means for kneading said composite between said upper and lower carriers thereby to mix the uncured resin, fiber and filler constituents thereof and to remove entrapped gas therefrom prior to curing; means for pulling said carriers from said supply rolls through said successive stations and carrier removal and storage roll take-up means following said pulling means by which said upper and lower carriers are removed from the cured rigid composite and stored for replacement of said supply rolls, said carrier removal and storage roll take-up means comprising a carrier roll spindle for each of said upper and lower carriers, and cradling roller means for rotating said spindles in a manner allowing drive slippage whereby said spindles may be rotated at varying angular velocities while said cradling rollers are driven at constant speed.

9. In an apparatus for manufacturing rigid structural flat sheet or shaped panels from a composite of reinforced resinous matrix material, the combination comprising: a material dispensing tower; support means for positioning supply rolls of lower and upper sheet material carriers respectively at the front and rear of said dispensing tower; a lower matrix dispenser including means to deposit a uniform coating of uncured resinous matrix material of predetermined thickness onto said lower carrier; means to distribute separated discrete reinforcing fibers uniformly over said matrix on said lower carrier; means on said tower downstream from said fiber distributing means in relation to carrier travel for impinging particularized filler against said fibers and matrix uniformly across the width of said matrix coating; an upper matrix dispenser including means to deposit a uniform uncured resinous coating of predetermined thickness to said upper carrier; means for bringing the coating on said upper carrier into overlying coextensive relation with said lower carrier sheet and the material thereon; means defining successive treatment and curing stations for converting said composite of matrix material and reinforcing fibers from a relatively pliable condition to a substantially rigid condition, said last mentioned means including a compactor station having means for kneading said composite between said upper and lower carriers thereby to mix the uncured resin, fiber and filler constituents thereof and to remove entrapped gas therefrom prior to curing; means for pulling said carriers from said supply rolls through said successive stations and carrier removal and storage roll take-up means following said pulling means by which said upper and lower carriers are removed from the cured rigid composite and stored for replacement of said supply rolls, at least one elongated curing oven having a flat floor of a width equal to or greater than the width than said carriers, a removable forming mold of corrugated cross-section supported by said floor and means for constraining the composite between said carriers to the cross-sectional configuration of said forming mold, said constraining means comprising a plurality of torque tubes extending transversely of the curing oven at a level above said forming mold, a plurality of resilient spring arms extending from each of said torque tubes, and a wiper blade supported at the end of each of said spring arms.

10. the apparatus recited in claim 9 including means to fix the angular position of said torque tubes and thereby set the pressure exerted by said wipers against the said composite material and said forming means.

* * * * *

UNITED STATES PATENT OFFICE
CERTIFICATE OF CORRECTION

Patent No. 3,956,055            Dated   May 11, 1976

Inventor(s)   Buddy L. Duft, et. al.

It is certified that error appears in the above-identified patent and that said Letters Patent are hereby corrected as shown below:

Column 3, line 33, "line 6-6" should read --line 16-16--;

Column 7, line 36, "portion at" should read --portion diverges at--;

Column 9, line 11, "kneadiding" should read --kneading--;

Column 10, line 1, "usedd" should read --used--;

Column 10, line 61, "outlet of" should read --outlet end of--;

Column 11, line 2, "wheels 200 adjustably" should read --wheels 200 are adjustably--;

Column 11, line 54, "46 constantly" should read --46 of constantly--;

Column 12, line 50, should be deleted in its entirety;

Column 12, line 51, "distributing means further comprises]" should be deleted;

Column 14, line 57, "comopsite" should read --composite--;

Column 14, line 58, "said rolls" should read --said supply rolls--;

Column 16, line 42, "the" should read --The--.

Signed and Sealed this

Fourteenth Day of December 1976

[SEAL]

Attest:

RUTH C. MASON
*Attesting Officer*

C. MARSHALL DANN
*Commissioner of Patents and Trademarks*